(12) United States Patent
Kim et al.

(10) Patent No.: US 9,236,049 B2
(45) Date of Patent: Jan. 12, 2016

(54) MASH-UP SERVICE GENERATION APPARATUS AND METHOD BASED ON VOICE COMMAND

(71) Applicant: Electronics & Telecommunications Research Institute, Daejeon (KR)

(72) Inventors: Jae Chul Kim, Daejeon (KR); Seong Ho Lee, Daejeon (KR); Young Jae Lim, Daejeon (KR); Yoon Seop Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 23 days.

(21) Appl. No.: 14/078,426

(22) Filed: Nov. 12, 2013

(65) Prior Publication Data

US 2014/0136206 A1 May 15, 2014

(30) Foreign Application Priority Data

Nov. 12, 2012 (KR) .......................... 10-2012-0127608

(51) Int. Cl.

| G10L 17/00 | (2013.01) |
| G10L 15/18 | (2013.01) |
| H04M 1/57 | (2006.01) |
| G10L 15/22 | (2006.01) |
| G06F 3/16 | (2006.01) |
| G10L 15/26 | (2006.01) |
| G06F 17/27 | (2006.01) |

(52) U.S. Cl.
CPC ................ *G10L 15/18* (2013.01); *G06F 3/167* (2013.01); *G10L 15/22* (2013.01); *H04M 1/575* (2013.01); *G06F 17/277* (2013.01); *G10L 15/26* (2013.01); *G10L 2015/223* (2013.01)

(58) Field of Classification Search
CPC ... G10L 15/18; G10L 2015/223; G10L 15/22; G10L 15/26; H04M 1/575; H04M 1/6066; H04M 1/6075; H04M 1/72522; H04M 1/72527
USPC ........ 704/270–275, 249; 455/425, 563, 556.1
See application file for complete search history.

(56) References Cited

U.S. PATENT DOCUMENTS

| 2006/0123053 A1 | 6/2006 | Scannell, Jr. |
| 2008/0109483 A1* | 5/2008 | Yoo et al. .................... 707/104.1 |

(Continued)

FOREIGN PATENT DOCUMENTS

| KR | 10-0700626 B1 | 3/2007 |
| KR | 10-0859595 B1 | 9/2008 |

(Continued)

*Primary Examiner* — Vijay B Chawan

(57) ABSTRACT

Provided are a mash-up service generation apparatus and method based on a voice command. The mash-up service generation apparatus includes a voice recognizer configured to convert a voice command into a character string, a mash-up natural language processor configured to extract a word corresponding to a mash-up module based on the character string, and convert the word into at least one of metadata of the mash-up module and metadata of a mash-up sequence in which a plurality of mash-up modules are combined, and a mash-up sequence processor configured to search for and select a target mash-up sequence corresponding to the metadata of the mash-up sequence, and newly generate the target mash-up sequence. Accordingly, a customized mash-up service can be provided to a user.

16 Claims, 4 Drawing Sheets

(56) References Cited

U.S. PATENT DOCUMENTS

2009/0193148 A1    7/2009    Jung et al.
2011/0161833 A1*   6/2011    Dheap et al. .................. 715/753
2011/0202594 A1*   8/2011    Ricci ............................. 709/203

FOREIGN PATENT DOCUMENTS

| | | |
|---|---|---|
| KR | 10-2009-0015574 A | 2/2009 |
| KR | 10-2009-0083835 A | 8/2009 |
| KR | 10-2010-0129516 A | 12/2010 |

* cited by examiner

MASH-UP SERVICE GENERATION APPARATUS AND METHOD BASED ON VOICE COMMAND

CLAIM FOR PRIORITY

This application claims priority to Korean Patent Application No. 10-2012-0127608 filed on Nov 12, 2012 in the Korean Intellectual Property Office (KIPO), the entire contents of which are hereby incorporated by reference.

BACKGROUND

1. Technical Field

Example embodiments of the present invention relate in general to a mash-up service generation apparatus and method and more specifically to a mash-up service generation apparatus and method based on a voice command.

2. Related Art

Generally, mash-up denotes combining and applying various types of contents or services to generate new contents or services. Here, the various types of contents or services may be configured with a program module called a block. The mash-up denotes a web-based data integration application, and may be generated using a mash-up authoring tool that connects or combines a plurality of the above-described blocks. As a detailed example of the mash-up, there is an application in which a map service of Daum is combined with a photograph service of Naver. When a user clicks a specific position of a map with a mouse, the above-described mash-up allows photographs associated with the clicked position to be displayed on the map.

Here, in a general mash-up working process, a mash-up developer designs a kind of mash-up to produce, and searches for and selects a plurality of open application interfaces (APIs) to be used to produce the designed mash-up. The mash-up developer analyzes a map open API of Daum and an open API of Naver, and checks characteristics of the respective open API services, namely, blocks. Here, the characteristics of the blocks may be, for example, a communication protocol (a code), a data format, and a type of input/output data.

That is, a mash-up authoring apparatus places or arranges open APIs, namely, blocks, and connects inputs and outputs of the respective blocks using a data format of the input and output of each of the blocks. Also, the mash-up authoring apparatus specifies scripts or codes.

Recently, demand and supply for lots of smartphones, tablet personal computers (PCs), etc. are increasing, and a manipulation scheme of mobile equipment is becoming diversified in proportion to the demand and supply. Also, recently, due to the spread of smart devices and the generalization of open services (open APIs), users require various additional services.

However, a current service merely provides simple voice recognition and a unilateral response, namely, a secretary-type response, and cannot use a multimedia service function that is a characteristic of smart equipment. For this reason, the current service cannot be customized and provided to a user. Such a problem occurs because there are no method and apparatus that combine open APIs to automatically generate a new mash-up service.

In other words, a general mash-up service generation apparatus generates a mash-up service using a difficult programming that requires the use of a keyboard and a mouse, without using the newest function such as voice recognition.

The general mash-up service generation apparatus is difficult to be implemented in an environment in which a resource is limited, and has a problem that general users lacking programming knowledge cannot conveniently generate a general mash-up service.

SUMMARY

Accordingly, example embodiments of the present invention are provided to substantially obviate one or more problems due to limitations and disadvantages of the related art.

Example embodiments of the present invention provide a mash-up service generation apparatus that generates a mash-up service using a voice command, thus enabling a general user to generate a desired customized mash-up service.

Example embodiments of the present invention also provide a mash-up service generation method that generates a mash-up service using a voice recognition function of smart equipment to generate a mash-up service, thus enabling a general user to easily generate the mash-up service.

In some example embodiments, a mash-up service generation apparatus includes: a voice recognizer configured to convert a voice command into a character string; a mash-up natural language processor configured to extract a word corresponding to a mash-up module based on the character string, and convert the word into at least one of metadata of the mash-up module and metadata of a mash-up sequence in which a plurality of mash-up modules are combined; and a mash-up sequence processor configured to search for and select a target mash-up sequence corresponding to the metadata of the mash-up sequence, and newly generate the target mash-up sequence.

When the target mash-up sequence already exists, the mash-up sequence processor may search for and select the target mash-up sequence, and when there is no target mash-up sequence, the mash-up sequence processor may request a target mash-up module corresponding to the metadata of the mash-up module, and generate the target mash-up sequence using the target mash-up module.

The mash-up service generation apparatus may further include a mash-up module manager configured to search for the target mash-up module to compare input and output parameters of the target mash-up module.

The mash-up module manager may search a web to find a new target mash-up module corresponding to the metadata of the mash-up module, and register the new target mash-up module.

The mash-up service generation apparatus may further include a runtime manager configured to call or generate a runtime code corresponding to the target mash-up sequence.

When the target mash-up sequence is selected and searched, the runtime manager may call the runtime code, and when the target mash-up sequence is newly generated, the runtime manager may automatically generate the runtime code.

The runtime manager may drive the runtime code to generate a mash-up service.

The mash-up service generation apparatus may further include a mash-up display configured to display the mash-up service on a web browser.

The mash-up service generation apparatus may further include a mash-up sequence database (DB) configured to store the target mash-up sequence and a block DB configured to store the target mash-up module.

The mash-up service generation apparatus may further include a runtime DB configured to store the runtime code.

In other example embodiments, a mash-up service generation method, which generates a mash-up service in a mash-up service generation apparatus, includes: converting a voice command into a character string; extracting a word corresponding to a mash-up module based on the character string; converting the word into at least one of metadata of the mash-up module and metadata of a mash-up sequence in which a plurality of mash-up modules are combined to issue a character instruction; and requesting a target mash-up sequence corresponding to the metadata of the mash-up sequence, in response to the character instruction.

The requesting of a target mash-up sequence may include, when the target mash-up sequence corresponding to the metadata of the mash-up sequence already exists, searching for and selecting the target mash-up sequence, and when there is no target mash-up sequence, newly generating the target mash-up sequence corresponding to the metadata of the mash-up sequence.

The newly generating of the target mash-up sequence may include requesting a target mash-up module corresponding to the metadata of the mash-up module, and searching for the target mash-up module to compare input and output parameters of the target mash-up module.

The newly generating of the target mash-up sequence may include combining a plurality of the target mash-up modules.

The newly generating of the target mash-up sequence may include searching a web to find a new target mash-up module corresponding to the metadata of the mash-up module to newly register the new target mash-up module.

The mash-up service generation method may further include calling or generating a runtime code corresponding to the target mash-up sequence to provide the runtime code.

The providing of the runtime code may include, when the target mash-up sequence is searched and selected, calling the runtime code, and when the target mash-up sequence is newly generated, automatically generating the runtime code.

The providing of the runtime code may include driving the runtime code to generate a mash-up service.

The mash-up service generation method may further include displaying the mash-up service on a web browser.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
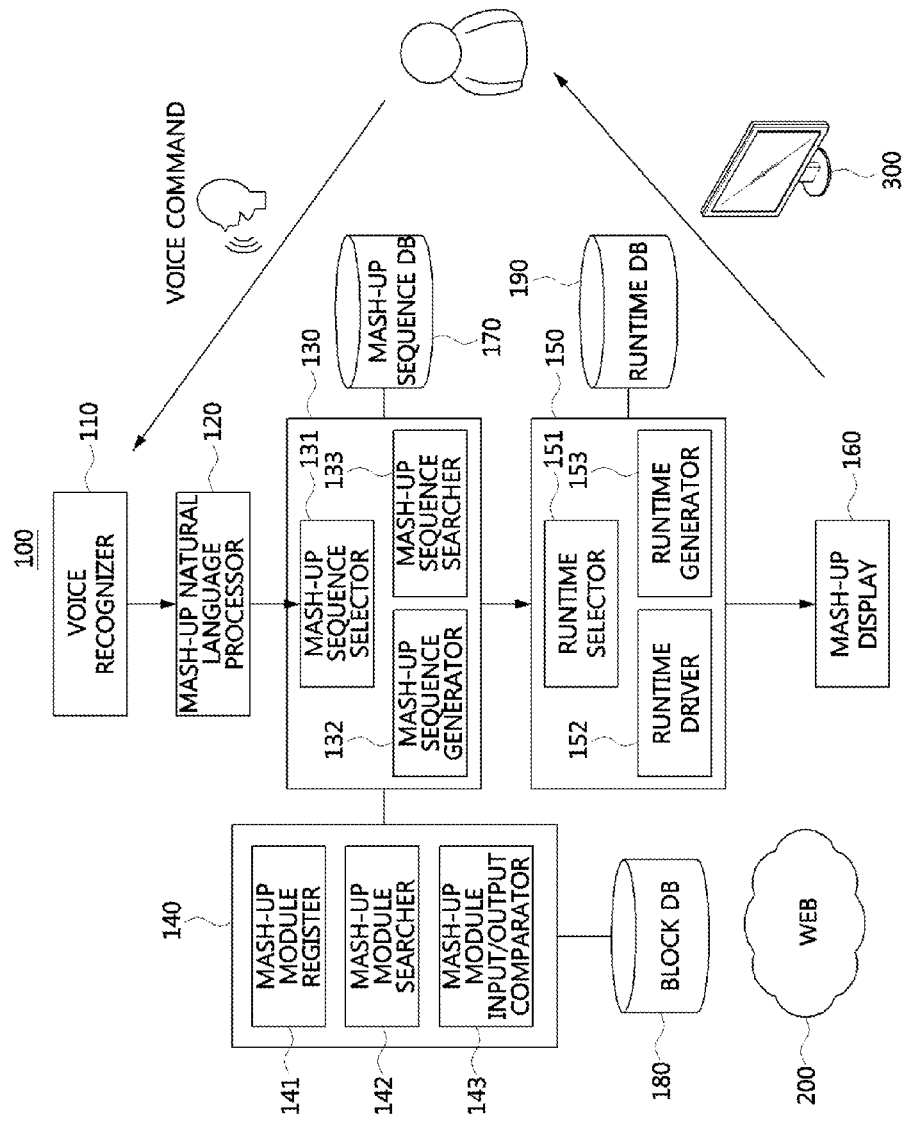
FIG. 1 is a conceptual diagram schematically illustrating a configuration of a mash-up service generation apparatus based on a voice command according to an embodiment of the present invention.

Since the present invention may have diverse modified embodiments, preferred embodiments are illustrated in the drawings and are described in the detailed description of the invention. However, it should be understood that the particular embodiments are not intended to limit the present disclosure to specific forms, but rather the present disclosure is meant to cover all modification, similarities, and alternatives which are included in the spirit and scope of the present disclosure. Like numbers refer to like elements throughout the description of the figures, Relational terms such as first, second, A, B, and the like may be used for describing various elements, but the elements should not be limited by the terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the following description, the technical terms are used only for explaining a specific exemplary embodiment while not limiting the present disclosure. The terms of a singular form may include plural forms unless referred to the contrary. The meaning of 'comprise,' include; or 'have' specifies the presence of stated features, integers, steps, operations, elements, components, and/or groups thereof, but does not preclude the presence or addition of one or more other features, integers, steps, operations, elements, components, and/or groups thereof.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally or excessively construed as formal meanings.

Hereinafter, embodiments of the present invention will be described below in more detail with reference to the accompanying drawings.

FIG. 1 is a conceptual diagram schematically illustrating a configuration of a mash-up service generation apparatus 100 based on a voice command according to an embodiment of the present invention. Hereinafter, for the convenience of description, the mash-up service generation apparatus 100 based on a voice command is referred to as a mash-up service generation apparatus 100.

Referring to FIG. 1, first, the mash-up service generation apparatus 100 according to an embodiment of the present invention includes a voice recognizer 110, a mash-up natural language processor 120, a mash-up sequence processor 130, a mash-up module manager 140, a runtime manager 150, and a mash-up display 160.

Moreover, the mash-up service generation apparatus 100 may include a mash-up sequence database (DB) 170, a block DB 180, and a runtime DB 190.

Here, the voice recognizer 110 receives a voice command from a user, and converts the voice command into a digital character string recognizable by the mash-up service generation apparatus 100.

Moreover, the voice recognizer 110 provides the digital character string to the mash-up natural language processor 120.

Specifically, for example, when a voice command of "Display weather and traffic information around Everland." is input from a user, the voice recognizer 110 converts the voice command into a digital character string corresponding to the voice command, and supplies the digital character string to the mash-up natural language processor 120.

The mash-up natural language processor 120 receives the digital character string corresponding to the voice command, analyzes the digital character string as a morpheme, and extracts a word corresponding to a mash-up module.

Moreover, the mash-up natural language processor 120 converts the extracted word into at least one of metadata of the mash-up module and metadata of a mash-up sequence.

Moreover, the mash-up natural language processor 120 transfers the metadata of the mash-up module and the metadata of the mash-up sequence, which correspond to the extracted word, to the mash-up sequence processor 130.

The mash-up module, for example, is called a block, and denotes that each of various contents and services provided by a web service provider is configured with a program module in a web 200. For example, a map service of Google, a real estate information service of Craigslist that is a real estate information site, a photograph service of Flickr, a video service of YouTube, and a weather service of Yahoo are each configured with a program module, and thus may become a mash-up module (a block). That is, the mash-up module denotes a module that performs a general function or a unit function provided as an open API.

The metadata denotes secondary information that is obtained by arranging an information type so as to intellectually control and structurally access information. That is, an information type of a characteristic expressing the mash-up module is metadata, and the metadata may be defined as "data of data" in the sense of data defining a type of data.

The mash-up sequence, for example, denotes a service in which a plurality of mash-up modules are combined and provided to a user. Specifically, for example, the mash-up sequence may be a service that, when the map service of Google and the weather service of Yahoo are combined and a specific area is clicked, informs weather information of the clicked area.

In this case, the metadata of the mash-up module and the metadata of the mash-up sequence are, for example, information used for various information searches of the mash-up module and the mash-up sequence, and include input/output information (i.e., a data format) of the mash-up module and the mash-up sequence. As the data format, for example, there is XML, JSON, or PHP.

Moreover, the metadata of the mash-up module and the metadata of the mash-up sequence may further include, for example, information on a communication protocol or hyper text markup language (HTML) shown in a web page.

Here, the communication protocol is for transmitting and receiving data to and from an open API service provider, and for example, there is JAVA script, REST, or SOAP. That is, the communication protocol denotes a code for performing a unit function.

As described above, the mash-up natural language processor 120 analyzes the digital character string as a morpheme to extract a word corresponding to a mash-up module.

Specifically, for example, the mash-up natural language processor 120 analyzes POS tag information of an input character string to separate words in the form of pseudo-morphemes, and analyzes a POS tag of each of the words.

Here, the pseudo-morpheme denotes a new decoding unit of a separation reference suitable for a voice recognition operation while maintaining a characteristic of a morpheme that is a linguistic unit.

The POS tag denotes an operation principle of a morpheme analyzer for a morpheme of a character string. The morpheme analyzer divides each of words composing a sentence into morphemes, and each of the divided morphemes is changed to a type in which its own spelling is connected to a tag of a part of speech corresponding thereto. Here, each of morphemes in which tag information is combined may be treated as one word.

A more detailed example will be described using a digital character string corresponding to "Display weather and traffic information around Everland." that is a voice command.

In this case, the mash-up natural language processor 120 extracts the digital character string as words (for example, Everland (around) (corresponding to a mash-up module indicating a position), weather, traffic information, and map (display)) corresponding to the mash-up module.

Moreover, the mash-up natural language processor 120 converts the extracted words into metadata of a mash-up module and metadata of a mash-up sequence, and supplies the metadata to the mash-up sequence processor 130.

The mash-up sequence processor 130 receives the metadata, searches for and selects or newly generates a mash-up sequence corresponding to the metadata, and supplies the mash-up sequence to the runtime manager 150.

To this end, the mash-up sequence processor 130 may include a mash-up sequence selector 131, a mash-up sequence generator 132, and a mash-up sequence searcher 133.

First, the mash-up sequence searcher 133 searches the mash-up sequence DB 170 to find a mash-up sequence corresponding to metadata. Here, the searched result indicates, for example, information on whether the mash-up sequence corresponding to the metadata is stored in the mash-up sequence DB 170.

Moreover, for example, the mash-up sequence searcher 133 may supply the searched result, indicating whether there is the mash-up sequence corresponding to the metadata, to the mash-up sequence selector 131 and the mash-up sequence generator 132.

At this time, when the mash-up sequence corresponding to the metadata is stored in the mash-up sequence DB 170, the mash-up sequence selector 131 selects the mash-up sequence corresponding to the metadata, and supplies the selected mash-up sequence to the runtime manager 150.

On the other hand, when the mash-up sequence corresponding to the metadata is not stored in the mash-up sequence DB 170, the mash-up sequence generator 132 receives a mash-up module capable of configuring the mash-up sequence corresponding to the metadata, and generates a new mash-up sequence based on the mash-up module. At this time, the mash-up sequence processor 130 may store the newly generated mash-up sequence in the mash-up sequence DB 170.

Moreover, the mash-up sequence generator 132 supplies the newly generated mash-up sequence to the runtime manager 150.

At this time, the mash-up sequence generator 132 may receive the mash-up module configuring the mash-up sequence corresponding to the metadata from the mash-up module manager 140.

The mash-up module manager 140 searches for a mash-up module corresponding to an extracted word, and compares input and output parameters of the searched mash-up module to supply a connectable mash-up module to the mash-up sequence processor 130. In other words, the mash-up module manager 140 searches for a mesh-up module using metadata of the mesh-up module.

To this end, the mash-up module manager 140 may include a mash-up module register 141, a mash-up module searcher 142, and a mash-up module input/output comparator 143.

The mash-up module register 141 stores a new mash-up module of the web 200 in the block DB 180.

Specifically, for example, when a mash-up module capable of configuring a mash-up sequence is not stored in the block DB 180, the mash-up module register 141 may search for a corresponding mash-up module in the web 200, and newly store the searched mash-up module in the block DB 180.

The mash-up module searcher 142 searches the block DB 180 to find a mash-up module capable of configuring the mash-up sequence corresponding to the metadata, and transfers the found mash-up module to the block DB 180.

The mash-up module input/output comparator 143 compares input and output parameters of the transferred mash-up module to determine whether the mash-up module is connectable.

The mash-up module input/output comparator 143 supplies a connectable mash-up module to the mash-up sequence processor 130.

Here, the mash-up module has its own input and output parameters. Specifically, for example, the mash-up module may have n (n≥1) number of input parameters and m (m≥1) number of output parameters. Also, each of the n input parameters has a data type. Likewise, each of the m output parameters has a data type.

A mash-up module_A will be described as an example. The mash-up module_A may have the following four input parameters.

Building Name (type: string(01))
Latitude (type: float(03))
Longitude (type: float(03))
Time (type: dateType(04))

That is, the mash-up module_A has the four input parameters, and respective data types of the four input parameters are string, float, float, and dateType.

Moreover, the mash-up module_A has one output parameter, which is defined as follows.

Distance Value (type: float(03))

In this case, for example, the mash-up module input/output comparator 143 respectively compares the numbers of input and output parameters of combined mash-up modules, meanings of titles, and data types of blocks, and informs a combinability between the mash-up modules.

The runtime manager 150 searches the runtime DB 190 to find and execute a runtime code (a execution code) corresponding to the transferred mash-up sequence, or newly generates and executes the runtime code corresponding to the mash-up sequence.

To this end, the runtime manager 150 may include a runtime selector 151, a runtime driver 152, and a runtime generator 153.

Here, the runtime selector 151 searches the runtime DB 190 to find a runtime code corresponding to a mash-up sequence.

At this time, when there is the runtime code corresponding to the mash-up sequence, the runtime selector 151 supplies the runtime code to the runtime driver 152.

On the other hand, when there is no runtime code corresponding to the mash-up sequence, the runtime selector 151 supplies runtime generation information, which is information indicating that a runtime code should be newly generated because there is no runtime code, to the runtime generator 153.

The runtime generator 153 receives the runtime generation information, automatically generates the runtime code corresponding to the mash-up sequence, and supplies the runtime code to the runtime driver 152.

The runtime driver 152 executes the supplied runtime code, and supplies the executed result to the mash-up display 160. Here, the executed result may be, for example, a mash-up service.

The mash-up display 160 displays the executed mash-up service on a web browser 300, thereby enabling a user to use the mash-up service.

The mash-up sequence DB 170 stores various mash-up sequences, and supplies a mash-up sequence, requested by the mash-up sequence processor 130, to the mash-up sequence processor 130.

The block DB 180 stores various mash-up modules, and supplies a mash-up module, requested by the mash-up module manager 140, to the mash-up module manager 140.

The runtime DB 190 stores various runtime codes, and supplies a runtime code, requested by the runtime manager 150, to the runtime manager 150.

Each of the DBs may be configured as, for example, a general database.

Hereinafter, a mash-up service generation method according to an embodiment of the present invention will be described with reference to FIG. 2.

Figure 2:
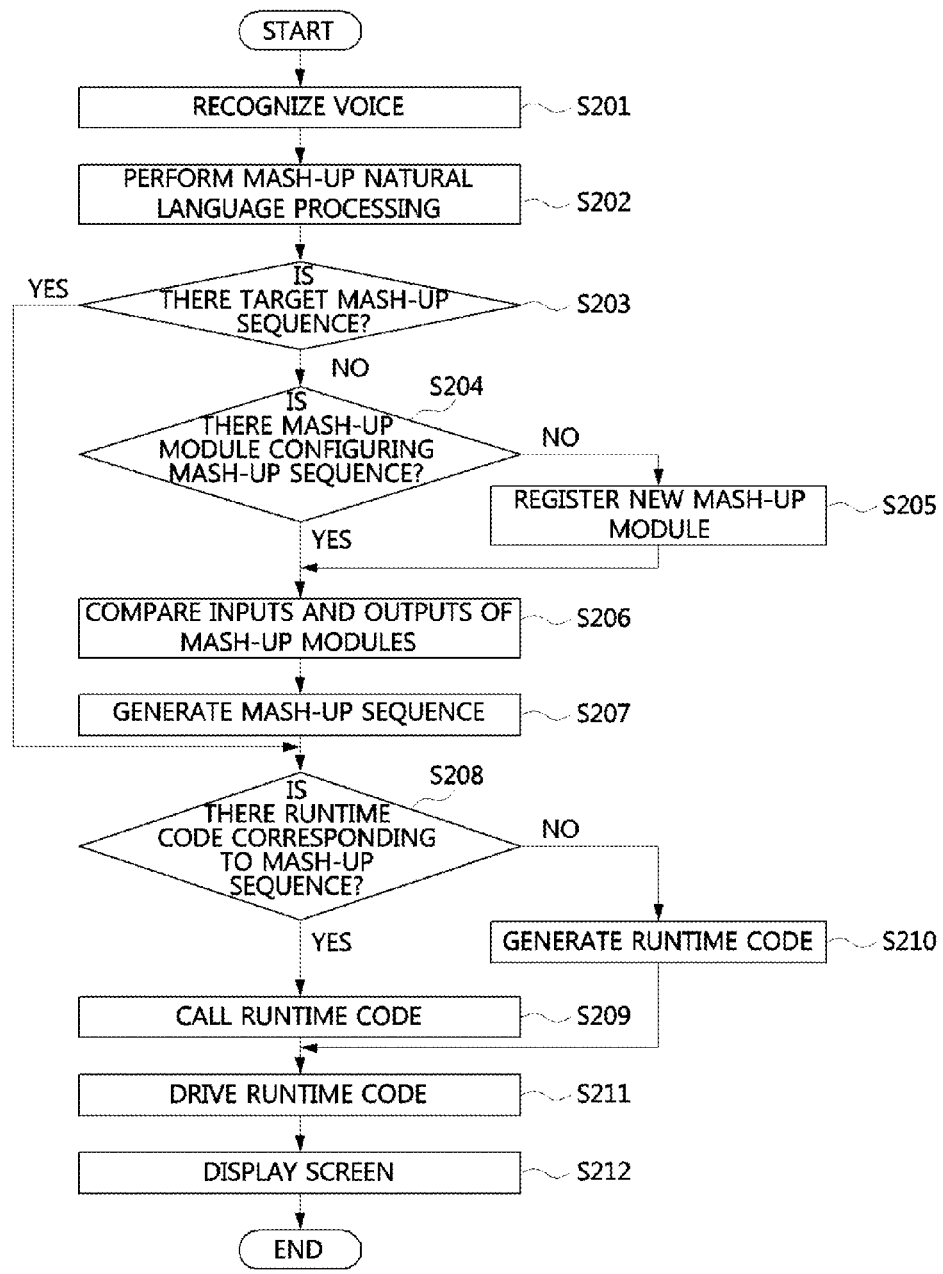
FIG. 2 is a flowchart illustrating a method in which the mash-up service generation apparatus generates a mash-up service, according to an embodiment of the present invention.

FIG. 2 is a flowchart illustrating a method in which the mash-up service generation apparatus generates the mash-up service, according to an embodiment of the present invention.

First, the mash-up service generation apparatus generates a digital character string corresponding to a voice command input from a user to recognize a voice in operation S201.

The mash-up service generation apparatus analyzes the digital character string as morphemes to extract a word corresponding to a mash-up module, and performs a mash-up natural language processing that generates metadata of the mash-up module and a mash-up sequence which correspond to the digital character string in operation S202.

The mash-up service generation apparatus determines whether there is a mash-up sequence corresponding to the metadata of the mash-up sequence in operation S203.

At this time, when there is no mash-up sequence corresponding to the metadata of the mash-up sequence, the mash-up service generation apparatus determines whether there is a mash-up module capable of configuring the mash-up sequence based on the metadata of the mash-up module in operation S204. Here, when there is no mash-up module capable of configuring the mash-up sequence, the mash-up service generation apparatus registers a new mash-up module in operation S205.

When there is the existing mash-up module or there is the mash-up module capable of configuring the mash-up sequence by newly registering the mash-up module, the mash-up service generation apparatus compares input and output parameters of mash-up modules in operation S206.

Subsequently, when the mash-up modules are combinable therebetween as the compared result of the mash-up modules, the mash-up service generation apparatus combines the mash-up modules to generate a mash-up sequence in operation S207.

When there is the mash-up sequence corresponding to the metadata of the mash-up sequence or the mash-up sequence is newly generated, the mash-up service generation apparatus determines whether there is a runtime code corresponding to the mash-up sequence in operation S208.

At this time, when there is the runtime code corresponding to the mash-up sequence, the mash-up service generation apparatus calls the runtime code in operation S209. On the other hand, when there is no runtime code corresponding to the mash-up sequence, the mash-up service generation apparatus automatically generates the runtime code corresponding to the mash-up sequence in operation S210.

The mash-up service generation apparatus drives the called or generated runtime code in operation S211. The mash-up service generation apparatus displays a mash-up service, generated by driving the runtime code, on a screen in operation S212, and thus the mash-up service generation method according to an embodiment of the present invention is completed.

Hereinafter, a driving method of the mash-up service generation apparatus according to an embodiment of the present invention will be described in more detail with reference to FIG. 3.

Figure 3:
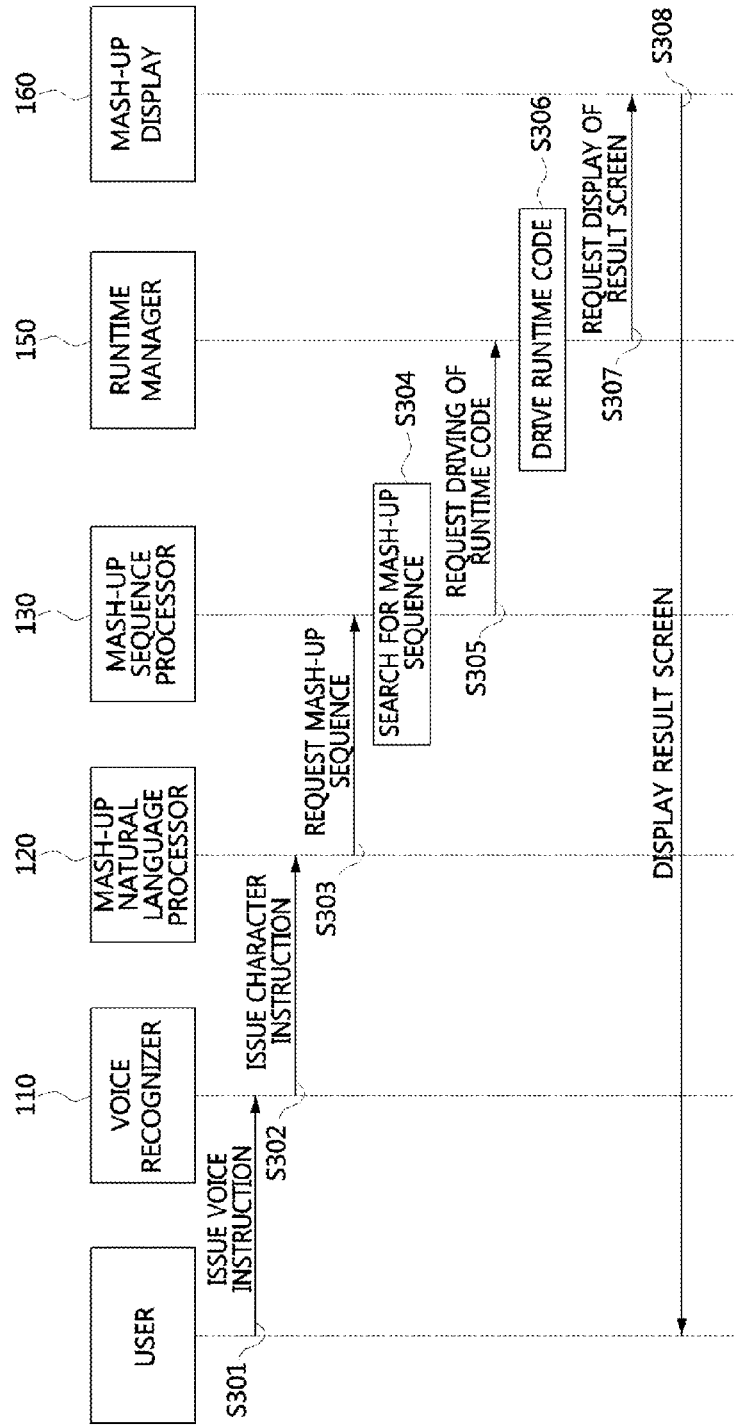
FIG. 3 is a flowchart illustrating an overall method in which the mash-up service generation apparatus generates the mash-up service using a mash-up sequence stored in a mash-up sequence database (DB), according to an embodiment of the present invention.

FIG. 3 is a flowchart illustrating an overall method in which the mash-up service generation apparatus generates the mash-up service using the mash-up sequence stored in the mash-up sequence DB (170 in FIG. 1), according to an embodiment of the present invention.

First, the voice recognizer 110 receives a voice instruction, namely, a voice command, from a user in operation S301.

The voice recognizer 110 converts the voice instruction into a digital character string recognizable by the mash-up service generation apparatus, and supplies a character instruction to the mash-up natural language processor 120 in operation S302.

The mash-up natural language processor 120 analyzes the character instruction, extracts a word corresponding to a mash-up module, converts the extracted word into metadata corresponding to the mash-up module and a mash-up sequence, and requests the mash-up sequence from the mash-up sequence processor 130 in operation S303.

The mash-up sequence processor 130 searches for a mash-up sequence based on the metadata of the mash-up sequence in operation S304, and requests a driving of a runtime code corresponding to the searched mash-up sequence from the runtime manager 150 in operation S305. Here, it may be assumed that the runtime code corresponding to the mash-up sequence is stored in, for example, the runtime DB (190 in FIG. 1). This is because the existing mash-up sequence is used, and thus a runtime code corresponding thereto can be generated together and stored in advance. In this case, the mash-up sequence processor 130 may directly request a driving of the runtime code corresponding to the mash-up sequence from the runtime manager 150. Also, the runtime manager 150 may search for the runtime code corresponding to the mash-up sequence, and thus immediately drive the runtime code.

As an example, it is assumed that there is the existing runtime code corresponding to the mash-up sequence, but when there is no runtime code, a runtime code corresponding to the mash-up sequence may be newly generated.

The runtime manager 150 drives the runtime code corresponding to the mash-up sequence in operation S306, and requests a display of the driven result value on a screen from the mash-up display 160 in operation S307.

The mash-up display 160 displays a result screen, for example, on a web browser to supply the driven result to the user in operation S308.

Hereinafter, a method in which the mash-up service generation apparatus generates a mash-up service will be described in more detail with reference to FIG. 4.

Figure 4:
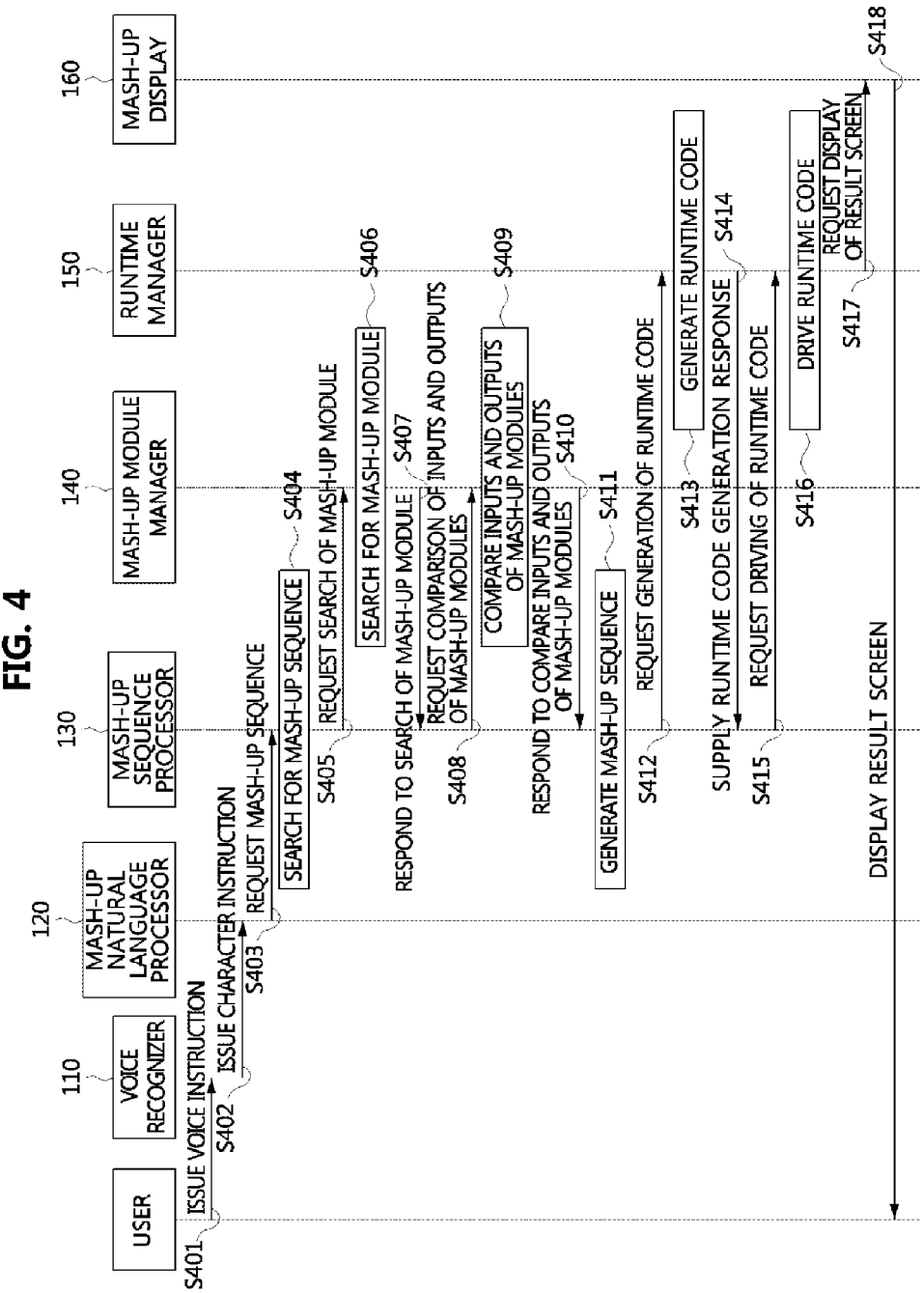
FIG. 4 is a flowchart illustrating in more detail a method in which the mash-up service generation apparatus generates a new mash-up sequence using a mash-up module to provide the mash-up service, according to an embodiment of the present invention.

FIG. 4 is a flowchart illustrating in more detail a method in which the mash-up service generation apparatus generates a new mash-up sequence using a mash-up module to provide the mash-up service, according to an embodiment of the present invention.

First, the voice recognizer 110 receives a voice instruction, namely, a voice command, from a user in operation S401.

The voice recognizer 110 converts the voice instruction into a digital character string recognizable by the mash-up service generation apparatus, and supplies a character instruction to the mash-up natural language processor 120 in operation S402.

The mash-up natural language processor 120 analyzes the character instruction, extracts a word corresponding to a mash-up module, converts the extracted word into metadata corresponding to the mash-up module and a mash-up sequence, and requests the mash-up sequence from the mash-up sequence processor 130 in operation S403.

The mash-up sequence processor 130 searches for a mash-up sequence based on the metadata of the mash-up sequence in operation S404. At this time, when there is no mash-up sequence corresponding to the metadata of the mash-up sequence, the mash-up sequence processor 130 requests a search of a mash-up module corresponding to the metadata of the mash-up module from the mash-up module manager 140 in operation S405. The mash-up module manager 140 searches for the mash-up module in operation S406, and supplies a response to the search of the mash-up module to the mash-up sequence processor 130 in operation S407.

The mash-up sequence processor 130 requests a comparison of inputs and outputs of mash-up modules from the mash-up module manager 140 in operation S408, and the mash-up module manager 140 compares the inputs and outputs of the mash-up modules in operation S409. Also, the mash-up module manager 140 supplies a response to the comparison of the inputs and outputs of the mash-up modules to the mash-up sequence processor 130 in operation S410.

The mash-up sequence processor 130 connects or combines the supplied mash-up modules to generate a mash-up sequence in operation S411. Although not shown, when there is the mash-up sequence corresponding to the metadata of the mash-up sequence, the mash-up sequence processor 130 may immediately use the searched mash-up sequence.

The mash-up sequence processor 130 requests generation of a runtime code corresponding to the generated mash-up sequence from the runtime manager 150 in operation S412, and the runtime manager 150 generates the runtime code corresponding to the mash-up sequence in operation S413. Here, since the mash-up sequence is generated using a new mash-up module, for example, a runtime code corresponding to a new mash-up sequence may not be stored in the runtime DB (190 in FIG. 1). Therefore, the runtime manager 150 automatically generates the runtime code corresponding to the new mash-up sequence in operation S413, and supplies a runtime code generation response to the mash-up sequence processor 130 in operation S414.

As an example, it is assumed that the runtime code corresponding to the newly generated mash-up sequence is not previously stored, but when the runtime code corresponding to the newly generated mash-up sequence is previously stored, the runtime code may be used.

The mash-up sequence processor 130 receiving the runtime code generation response requests a driving of the runtime code from the runtime manager 150 in operation S415.

Therefore, the runtime manager 150 drives the runtime code in operation S416, and by supplying the driven result value of the runtime code to the mash-up display 160, the runtime manager 150 requests a display of the result value on a screen from the mash-up display 160 in operation S417.

The mash-up display 160 displays the result value on the screen such as a web browser or the like in operation S418, thereby providing the mash-up service to the user.

As described above, the mash-up service generation apparatus and method according the embodiments of the present invention generates the mash-up service using a voice recognition function of smart equipment or the like.

Therefore, a general user breaks from the existing scheme in which a developer directly programs a mash-up service and unilaterally provides the mash-up service, and can directly generate a customized and personalized mash-up service using a voice command. Also, the general user can easily generate the mash-up service using the voice command.

In FIG. 1 of the present invention, for the convenience of description, the blocks having different configurations have been described above, but each of the elements may be configured as one block. For example, each of the blocks may be provided in a controller or a processor, and may perform the above-described series of operations.

The mash-up service generation apparatus according to the embodiments of the present invention generates the mash-up service using a voice command, thus enabling a general user to generate a desired customized mash-up service.

The mash-up service generation method according to the embodiments of the present invention generates the mash-up service using the voice recognition function of smart equipment to generate the mash-up service, thus enabling a general user to easily generate the mash-up service.

While the example embodiments of the present invention and their advantages have been described in detail, it should be understood that various changes, substitutions, and alterations may be made herein without departing from the scope of the invention.

What is claimed is:

1. A mash-up service generation apparatus comprising:
   a voice recognizer configured to convert a voice command into a character string;
   a mash-up natural language processor configured to extract a word corresponding to a mash-up module based on an analysis of the character string as a morpheme, and convert the word into metadata of the mash-up module and metadata of a mash-up sequence in which the mash-up module is combined;
   a mash-up sequence processor configured to search for and select a target mash-up sequence corresponding to the metadata of the mash-up sequence, or newly generate the target mash-up sequence; and
   a mash-up module manager configured to search for the target mash-up module and to compare input and output parameters of the target mash-up module,
   wherein, when the target mash-up sequence already exists, the mash-up sequence processor searches for and selects the target mash-up sequence, and
   wherein, when there is no target mash-up sequence, the mash-up sequence processor requests a target mash-up module corresponding to the metadata of the mash-up module, and generates the target mash-up sequence using the target mash-up module.

2. The mash-up service generation apparatus of claim 1, wherein the mash-up module manager searches a web to find a new target mash-up module corresponding to the metadata of the mash-up module, and registers the new target mash-up module.

3. The mash-up service generation apparatus of claim 1, further comprising a runtime manager configured to call or generate a runtime code corresponding to the target mash-up sequence.

4. The mash-up service generation apparatus of claim 3, wherein,
   when the target mash-up sequence is selected and searched, the runtime manager calls the runtime code, and
   when the target mash-up sequence is newly generated, the runtime manager automatically generates the runtime code.

5. The mash-up service generation apparatus of claim 3, wherein the runtime manager drives the runtime code to generate a mash-up service.

6. The mash-up service generation apparatus of claim 5, further comprising a mash-up display configured to display the mash-up service on a web browser.

7. The mash-up service generation apparatus of claim 1, further comprising:
   a mash-up sequence database (DB) configured to store the target mash-up sequence; and
   a block DB configured to store the target mash-up module.

8. The mash-up service generation apparatus of claim 3, further comprising a runtime DB configured to store the runtime code.

9. A mash-up service generation method, which generates a mash-up service in a mash-up service generation apparatus, comprising:
   converting a voice command into a character string;
   extracting a word corresponding to a mash-up module based on an analysis of the character string as a morpheme;
   converting the word into metadata of the mash-up module and metadata of a mash-up sequence in which the mash-up module is combined to issue a character instruction; and
   requesting a target mash-up sequence corresponding to the metadata of the mash-up sequence, in response to the character instruction,
   wherein the requesting of a target mash-up sequence comprises:
      when the target mash-up sequence corresponding to the metadata of the mash-up sequence already exists, searching for and selecting the target mash-up sequence; and
      when there is no target mash-up sequence, newly generating the target mash-up sequence corresponding to the metadata of the mash-up sequence, and
   wherein the newly generating of the target mash-up sequence comprises:
      requesting a target mash-up module corresponding to the metadata of the mash-up module;
      searching for the target mash-up module; and
      comparing input and output parameters of the target mash-up module.

10. The mash-up service generation method of claim 9, wherein the newly generating of the target mash-up sequence comprises combining the target mash-up module.

11. The mash-up service generation method of claim 9, wherein the newly generating of the target mash-up sequence comprises searching a web to find a new target mash-up module corresponding to the metadata of the mash-up module to newly register the new target mash-up module.

12. The mash-up service generation method of claim 9, further comprising calling or generating a runtime code corresponding to the target mash-up sequence to provide the runtime code.

13. The mash-up service generation method of claim 12, wherein the providing of the runtime code comprises:
- when the target mash-up sequence is searched and selected, calling the runtime code; and
- when the target mash-up sequence is newly generated, automatically generating the runtime code.

14. The mash-up service generation method of claim 12, wherein the providing of the runtime code comprises driving the runtime code to generate a mash-up service.

15. The mash-up service generation method of claim 14, further comprising displaying the mash-up service on a web browser.

16. The mash-up service generation method of claim 9, wherein extracting a word corresponding to a mash-up module based on an analysis of the character string as a morpheme includes analyzing POS tag information of the character string to separate words in the form of pseudo-morphemes, and analyzing the POS tag information of each of the words of the character string.

* * * * *